April 11, 1961 R. A. DAVISON 2,978,885
ROTARY OUTPUT ASSEMBLIES
Filed Jan. 18, 1960
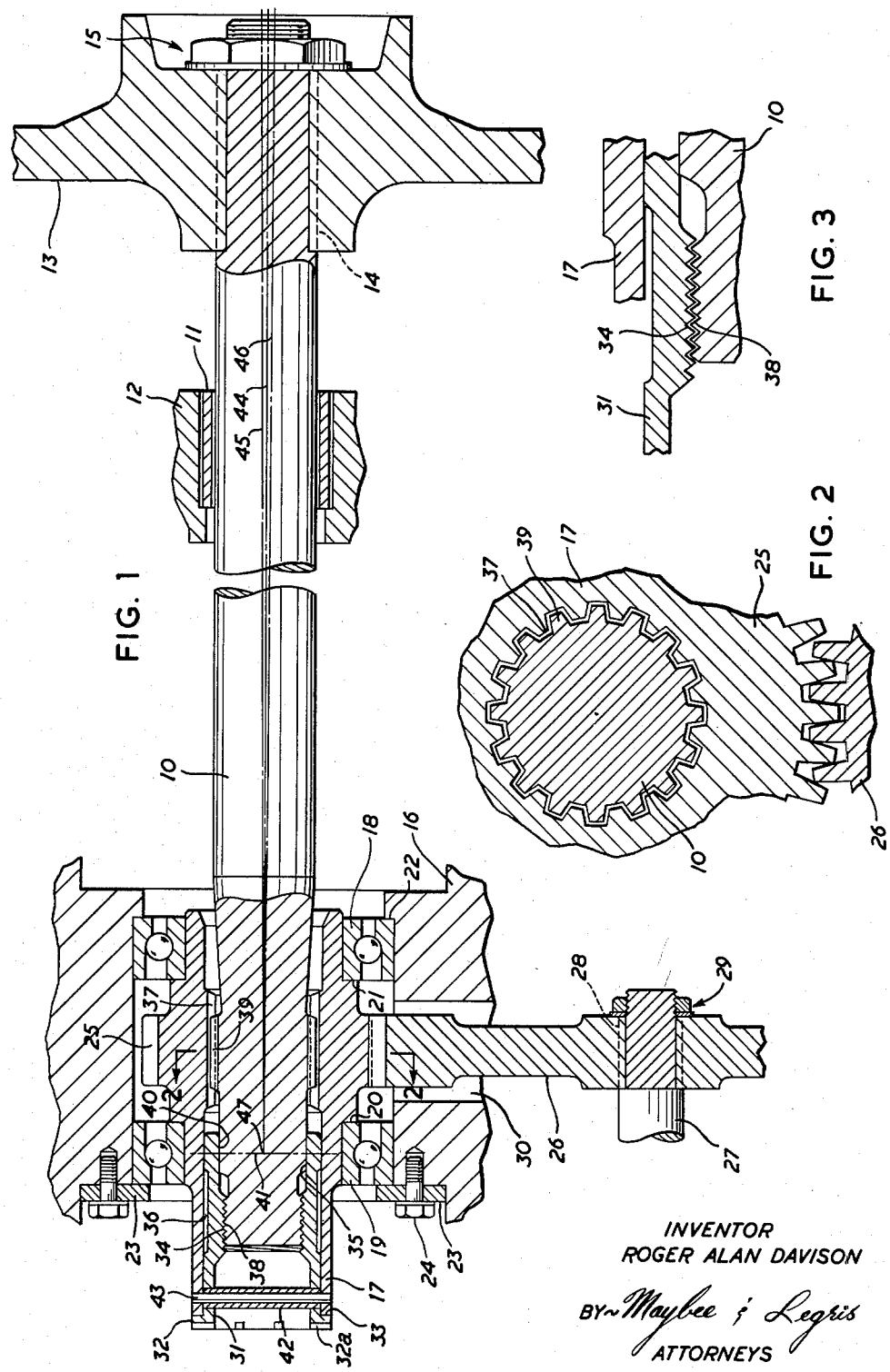
INVENTOR
ROGER ALAN DAVISON
BY Maybee ; Legris
ATTORNEYS

United States Patent Office 2,978,885
Patented Apr. 11, 1961

2,978,885

ROTARY OUTPUT ASSEMBLIES

Roger Alan Davison, Milton, Ontario, Canada, assignor to Orenda Engines Limited, Malton, Ontario, Canada, a corporation Filed Jan. 18, 1960, Ser. No. 3,071

7 Claims. (Cl. 64—1)

This invention relates to an assembly for delivering a rotary input to a gear wheel from an incompletely balanced rotary member subject to very high rotational speeds.

The invention is particularly applicable to the type of small gas turbine engine designed for industrial use. In such an engine it is necessary that the rotor rotate at very high speeds while in order to obtain useful power it is necessary that the output be delivered from a shaft rotating relatively slowly. In a typical engine of this type, the rotor may be designed to run at about 60,000 r.p.m. and may have an overspeed capability of 80,000 r.p.m. for about two minutes. At the present time there is no known balancing machine capable of economically balancing a rotor at such high speeds and any degree of unbalance in the rotor will, in a conventional structure, impose extremely high bearing loads on the structure and will lead to premature failure.

It is convenient to take the output from such an engine from a pinion driven by the rotor shaft and the pinion may mesh with a gear wheel which may be the first wheel of a reducing train of gears. In order to obviate high tooth loads it is necessary that the pinion be held in a mounting such that the rotational centre of the pinion is maintained in a constant position and that the gear wheel be similarly mounted. Since, as mentioned above, it is not economically possible completely to balance a rotor to run at the very high rotational speeds of 60,000 to 80,000 r.p.m., it is, therefore, the present practice in small gas turbine engines to partly balance the rotor and then to allow the rotor system to rotate about its own mass center whereby the rotor shaft will oscillate. It is not practical to couple the output pinion directly to the shaft since very high bearing loads would be encountered and very high tooth loads between the meshing gears would also be encountered due to the meshing teeth on the pinion and the gear wheel moving very rapidly in radial directions relative to one another as the rotor shaft oscillated.

It is an object of the invention to provide an assembly for delivering rotary input to a gear wheel from a rotary member, such as the rotor shaft of a small gas turbine engine, which is incompletely balanced and which is allowed to rotate about its own mass center.

The invention will now be described by way of example with reference to the accompanying drawings, in which:

Figure 1 is a longitudinal section of an assembly according to the invention,

Figure 2 is a transverse section on the line 2—2 of Figure 1 and on a larger scale, and Figure 3 is a detail, on a larger scale, of the mating screw threaded parts shown in Figure 1.

Referring now to the drawings, these illustrate an assembly forming part of a small gas turbine engine designed for industrial use. A rotor shaft is indicated at 10 and is supported adjacent one end in a floating bearing 11 held within standing structure 12 so that bearing has radial freedom of movement within the structure. Secured to one end of the shaft 10 is a rotor 13 which is located by mating splines 14 on the rotor and the shaft 4 and by a nut and washer assembly 15. The rotor system is partly, but not completely, balanced by conventional techniques and may have an unbalance of e.g. 0.05 ounce/inch.

The shaft 10 is supported adjacent to its other end, within standing structure 16 by means of an outer sleeve 17 which is embraced by a pair of fixed, spaced apart, ball bearings 18 and 19. The bearings are held in position between shoulders 20 and 21 on the sleeve 17, a shoulder 22 on the standing structure 16 and a bearing plate 23 secured to the standing structure 16 by bolts 24. A gear pinion 25 is formed integrally with the outer sleeve 17 and meshes with a gear wheel 26 secured to a shaft 27 by mating splines 28 and by a nut and washer assembly 29. The gear wheel 26 is enabled to mesh with the pinion 25 through a slot 30 in standing structure 16.

Mounted within the outer sleeve 17 is an inner sleeve 31 having a flange 32 at one end thereof; the flange 32 abuts the end 33 of the outer sleeve 17 and is formed with radial slots 32a. Formed within the inner sleeve 31 are internal screw threads 34 and a narrow, internal, cylindrical bearing surface 35; the outer surface of the inner sleeve is relieved as indicated at 36. The outer sleeve 17 is provided with internal splines 37 which extend axially of a portion of the bore of the sleeve. The shaft 10 has external screw threads 38 and external splines 39 to mate with the internal screw threads 34 and the internal splines 37 respectively.

The mating splines 37, 39 are indicated in greater detail in Figure 2. It will be seen that the splines 39 on the shaft 10 are dimensioned relatively to the splines 37 on the sleeve 17 so that the shaft 10 has limited freedom of movement relative to the sleeve 17 at the splines in all radial directions from the central position shown in Figure 2. Similarly, by reference to Figure 3, it will be seen that the mating screw threads 34, 38 are made a loose fit so that, at the mating threads, the shaft 10 has limited freedom of movement in all radial directions relative to the inner sleeve 31 from the central position shown in Figure 3.

Between the splines 39 and the screw threads 38 the shaft 10 has an external, cylindrical, bearing surface 40 which mates with the internal bearing surface 35 to provide a fulcrum for the oscillations of the shaft as will hereinafter be described. The bearing surface 35 is substantially bisected by a line 41 which passes through the center of the bearing 19.

A first hollow, split pin 42 passes through apertures in the end of the inner sleeve 31 and abuts the bore of the outer sleeve 17. A second hollow, split pin 43 passes through the first pin 42 and through apertures in the wall of the outer sleeve 17. Since both pins are split, they grip one another and provide means for preventing relative rotation between the sleeves 17 and 31. Moreover, the flange 32 together with the pins 42, 43 provide means for preventing relative longitudinal movement between the sleeves.

To give an example of the size of an installation of the type shown in the drawing, the rotor shaft 10 may have an overall length of approximately 9" with a maximum diameter of 0.625". The width of the mating bearing surfaces 35, 40 may be approximately 0.100". The maximum radial float at the floating bearings 11, 12, as will hereinafter be described, will be approximately 0.010" which will require maximum radial float at the splines 37, 39 of approximately 0.005" and at the threads 34 and 38 of approximately 0.002".

The operation of the assembly is as follows. As the rotor 13 and the shaft 10 rotate, since the system is unbalanced it will rotate about its mass center and the shaft 10 will float in the bearing 11 so that the axis of the shaft, indicated at 44, will describe a cone whose generators are indicated at 45 and 46 and whose apex is at the intersection of the axis 44 and the line 41, i.e. at the point 47, since the shaft is held at the bearing surfaces 35 and 40. The amount of oscillation of the shaft has been exaggerated in the drawing in the interests of clarity but the float will be of the order of dimensions recited above. It will be seen that the point 47 acts as a fulcrum for the shaft 10 so that it may oscillate as required due to its unbalance. The oscillation about the fulcrum is permitted since the splines 39 are able to move radially relatively to the splines 37 and the screw threads 38 are able to move radially relatively to the screw threads 34. The drive from the shaft 10 to the pinion 35 is taken primarily through the splines 37, 39 since the shaft 10 may rotate slightly relative to the inner sleeve 31, the extent of the rotation being limited by the circumferential clearance between adjacent splines 37 and 39.

It will be seen that the pinion 25 is held rigidly and the oscillations of the shaft due to its unbalance are not transmitted to the pinion so that its teeth remain concentric and no excessive tooth loads are imposed between the pinion 25 and the gear wheel 26.

The axial position of the shaft 10 relative to the standing structure 16 may be adjusted by turning the inner sleeve 31 by means of the slots 32a in the flange 32. When the desired adjustment is obtained, the rollpin 43 may be inserted into position and for this purpose a series of peripherally spaced apertures are provided in the outer sleeve 17.

It is desirable that the point 47 be on a line 41 which substantially bisects one of the bearings. However, a certain amount of displacement from this preferred position can be tolerated although it is desirable that the fulcrum be within one of the bearings otherwise a bending moment is induced in the bearing which is undesirable. The shaft bearing loads pass directly through the bearing surfaces 40 and 35 and through the inner sleeve 31 and the outer sleeve 17 to the bearings.

It will be seen that the invention provides a relatively simple assembly for delivery of rotary input to a gear wheel from a shaft which is incompletely balanced and which is subject to very high rotational speeds.

It will be understood that the form of the invention herewith shown and described is a preferred example and that various modifications may be carried out without departing from the spirit of the invention or the scope of the appended claims.

What I claim as my invention is:

1. An assembly for delivery a rotary input to a gear wheel from an incompletely balanced rotary member subject to very high rotational speeds, the assembly comprising a shaft secured to said member, an outer sleeve surrounding an end portion of the shaft, a gear pinion secured to the exterior of the sleeve intermediate the ends thereof to mesh with said gear wheel, a pair of fixed, spaced apart bearings embracing the sleeve and rotatably supporting it at positions at either side of said pinion, internal splines extending axially of a portion of the bore of the outer sleeve, an inner sleeve received within another portion of the bore of the outer sleeve, internal screw threads within the bore of the inner sleeve, external screw threads and external splines on the shaft to mate with the internal screw threads and internal splines respectively, the mating threads and splines being dimensioned so that at the splines and at the threads the shaft has limited freedom of movement relative to the sleeves in all radial directions, releasable means operable to prevent relative rotation between the inner and outer sleeves, abutment means to locate the inner sleeve longitudinally relative to the outer sleeve, a narrow internal bearing surface on one of said sleeves and located between said screw threads and said splines, and an external bearing surface on the shaft to mate with said internal bearing surface thus to provide a fulcrum for oscillations of the shaft.

2. An assembly for delivering a rotary input to a gear wheel from an incompletely balanced rotary member subject to very high rotational speeds, the assembly comprising a shaft secured to said member, an outer sleeve surrounding an end portion of the shaft, a gear pinion secured to the exterior of the sleeve intermediate the ends thereof to mesh with said gear wheel, a pair of fixed, spaced apart bearings embracing the sleeve and rotatably supporting it at positions at either side of said pinion, internal splines extending axially of a portion of the bore of the outer sleeve, an inner sleeve received within another portion of the bore of the outer sleeve, the inner sleeve having a flange at one end thereof arranged to abut one end of the outer sleeve, internal screw threads within the bore of the inner sleeve, external screw threads and external splines on the shaft to mate with the internal screw threads and internal splines respectively, the mating threads and splines being dimensioned so that at the splines and at the threads the shaft has limited freedom of movement relative to the sleeves in all radial directions, releasable means operable to prevent relative rotation between the inner and outer sleeves, a narrow internal bearing surface on one of said sleeves and located between said screw threads and said splines, and an external bearing surface on the shaft to mate with said internal bearing surface thus to provide a fulcrum for oscillations of the shaft.

3. An assembly for delivering a rotary input to a gear wheel from an incompletely balanced rotary member subject to very high rotational speeds, the assembly comprising a shaft secured to said member, an outer sleeve surrounding an end portion of the shaft, a gear pinion secured to the exterior of the sleeve intermediate the ends thereof to mesh with said gear wheel, a pair of fixed, spaced apart bearings embracing the sleeve and rotatably supporting it at positions at either side of said pinion, internal splines extending axially of a portion of the bore of the outer sleeve, an inner sleeve received within an end portion of the bore of the outer sleeve, internal screw threads within the bore of the inner sleeve, external screw threads and external splines on the shaft to mate with the internal screw threads and internal splines respectively, the mating threads and splines being dimensioned so that at the splines and at the threads the shaft has limited freedom of movement relative to the sleeves in all radial directions, a flange at one end of the inner sleeve to abut an end of the outer sleeve, a split hollow pin extending through the inner sleeve and having its ends abutting the bore of the outer sleeve, a second pin passing through said first pin and through aligned apertures in the outer sleeve, a narrow internal bearing surface on one of said sleeves and located between said screw threads and said splines, and an external bearing surface on the shaft to mate with said internal bearing surface thus to provide a fulcrum for oscillations of the shaft.

4. An assembly for delivering a rotary input to a gear wheel from an incompletely balanced member subject to very high rotational speeds, the assembly comprising a shaft secured to the member, an outer sleeve surrounding an end portion of the shaft, a gear pinion secured to the exterior of the sleeve intermediate the ends thereof to mesh with said gear wheel, a pair of fixed, spaced apart bearings embracing the sleeve and rotatably supporting it at positions at either side of said pinion, internal splines extending axially of a portion of the bore of the sleeve, an inner sleeve received within another portion of the bore of the outer sleeve, internal screw threads within the bore of the inner sleeve, external screw threads and external splines on the shaft to mate with the internal screw threads and internal splines respectively, the mating threads and splines being dimensioned to that at the splines and at the threads the shaft has limited freedom of movement relative to the sleeves in all radial directions, releasable means to prevent relative rotation between the inner and outer sleeves, abutment means to locate the inner sleeve longitudinally relative to the outer sleeve, a narrow internal bearing surface on one of said sleeves, and located between said screw threads and said splines so that said bearing surface is substantially bisected by the center line of one of said bearings, and an external bearing surface on the shaft to mate with said internal bearing surface thus to provide a fulcrum for oscillations of the shaft.

5. An assembly for delivering a rotary input to a gear wheel from an incompletely balanced member subject to very high rotational speeds, the assembly comprising a shaft secured to the member, an outer sleeve surrounding an end portion of the shaft, a gear pinion secured to the exterior of the sleeve intermediate the ends thereof to mesh with said gear wheel, a pair of fixed, spaced apart bearings embracing the sleeve and rotatably supporting it at positions at either side of said pinion, internal splines extending axially of a portion of the bore of the sleeve, an inner sleeve received within an end portion of the bore of the outer sleeve and extending beyond the end of the shaft, the inner sleeve being externally relieved intermediate its ends to provide an external shoulder at each end to engage the bore of the outer sleeve, internal screw threads within the bore of the inner sleeve, external screw threads and external splines on the shaft to mate with the internal screw threads and internal splines respectively, the mating threads and splines being dimensioned so that at the splines and at the threads the shaft has limited freedom of movement relative to the sleeves in all radial directions, releasable means passing through the outer sleeve and through the shoulder at one end of said inner sleeve to prevent relative rotation between the inner and outer sleeves, a narrow internal bearing surface in the bore of said inner sleeve adjacent to said other end thereof and internally of the other of said shoulders, said bearing surface being substantially bisected by the center line of one of said bearings and being located between said screw threads and said splines, and an external bearing surface on the shaft to mate with said internal bearing surface thus to provide a fulcrum for oscillations of the shaft.

6. In a prime mover, a shaft, a rotor secured to said shaft, a floating bearing for said shaft adjacent one end thereof, and an assembly at the other end of said shaft for delivering a rotary input to a gear wheel from the rotor, said assembly comprising an outer sleeve surrounding said other end of said shaft, a gear pinion secured to the exterior of the sleeve intermediate the ends thereof to mesh with said gear wheel, a pair of fixed, spaced apart bearings embracing the sleeve and rotatably supporting it at positions at either side of said pinion, internal splines extending axially of a portion of the bore of the outer sleeve, external splines on the shaft to mate with the internal splines in the sleeve, the splines being dimensioned so that, at the splines, the shaft has limited freedom of movement in all radial directions relative to the sleeve, an inner sleeve received within an end portion of the bore of the outer sleeve, internal screw threads within the bore of the inner sleeve, external screw threads at said other end of the shaft to mate with said internal screw threads in the bore of the inner sleeve, said mating threads being dimensioned so that, at the threads, the shaft has limited freedom of movement relative to the inner sleeve in all radial directions, releasable means to prevent relative rotation between the inner and outer sleeves, abutment means to locate the inner sleeve axially relative to the outer sleeve, a narrow internal bearing surface in the bore of said inner sleeve located between said screw threads and said splines, and an external bearing surface on the shaft to mate with said internal bearing surface thus to provide a fulcrum for oscillations of the shaft.

7. In a prime mover, a shaft, a rotor secured to said shaft, a floating bearing for said shaft adjacent to one end thereof and an assembly at the other end of the shaft for delivering a rotary input to a gear wheel from the rotor, said assembly comprising an outer sleeve surrounding said other end of the shaft, a gear pinion secured to the exterior of the sleeve intermediate the ends thereof to mesh with said gear wheel, a pair of fixed, spaced apart bearings embracing the sleeve and rotatably supporting it at positions at either side of said pinion, internal splines extending axially of a portion of the bore of the outer sleeve, external splines on the shaft to mate with the said internal splines, the mating splines being dimensioned so that, at the splines, the shaft has limited freedom of movement relative to the outer sleeve in all radial directions, an inner sleeve received within an end portion of the bore of the outer sleeve, internal screw threads within the bore of the inner sleeve, external screw threads at said other end of the shaft to mate with said internal screw threads in the bore of the inner sleeve, said mating threads being dimensioned so that, at the threads, the shaft has limited freedom of movement relative to the inner sleeve in all radial directions releasable means passing through said inner and outer sleeves to prevent relative rotation between the inner and outer sleeves, a narrow internal bearing surface in the bore of said inner sleeve, said bearing surface being substantially bisected by the center line of one of said bearings and being located between said screw threads and said splines, and an external bearing surface on the shaft to mate with said internal bearing surface thus to provide a fulcrum for oscillations of the shaft.

References Cited in the file of this patent

UNITED STATES PATENTS

| | | |
|---|---|---|
| 2,565,558 | Highberg | Aug. 28, 1951 |
| 2,778,565 | Atkinson | Jan. 22, 1957 |
| 2,883,885 | Upton | Apr. 28, 1959 |
| 2,911,138 | Birmann | Nov. 3, 1959 |